Patented July 7, 1925.

1,544,809

UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

METHOD OF TREATING CELLULOSE COMPOUNDS.

No Drawing.   Application filed July 2, 1921.   Serial No. 482,173.

*To all whom it may concern:*

Be it known that I, JOHN COLLINS CLANCY, a subject of the King of Great Britain, residing at Providence, in the county of Providence and State of Rhode Island, have invented certain new and useful Improvements in Methods of Treating Cellulose Compounds, of which the following is a specification.

This invention relates to an improved method of treating cellulose compounds, and has to do more particularly with the use of an improved solvent for cellulose esters and the formation through the instrumentality of said solvent of a cellulose compound possessing certain new and useful properties by reason of which it is capable of wide use in the arts.

While it is known that certain cellulose esters, such for example, as certain of the acetates and nitrates, are soluble in certain substances such as acetone, amyl acetate, tetrachlorethane and carbon bisulfid, the use of these substances as well as other solvents ordinarily employed for this purpose is open to certain objections such as the cost of the solvents, their inflammability, their poisonous nature and the difficulty experienced in removing the solvent from the final products.

Moreover, by no means all of the cellulose esters are soluble in any of the solvents named, and each of the above solvents is adapted for use with only an extremely limited number of the cellulose esters included in the classes mentioned above.

One object of the present invention is to provide a novel form of solvent for cellulose esters, including particularly the acetates and nitrates, which is capable of more general use than those now employed, which is capable of being readily used without the exercise of the care necessary in connection with some of those previously employed, which is relatively non-inflammable and which is capable of being readily separated from the resultant product.

Another object of the invention is to provide a novel method of treatment for cellulose esters whereby they may be readily dissolved and the cellulose compounds easily recovered from the solution and formed into materials having extensive use in the arts, such, for example, as artificial silk, photographic films, etc.

A further object of the invention is to provide a new composition of matter capable of extensive use and having certain novel characteristics not generally possessed by the materials formed from methods heretofore employed.

Other objects and advantages of the invention relate to certain novel steps and combinations of steps involved in the manufacture of the material as well as certain methods of combining the materials employed as will be more fully set forth in the detailed description to follow.

I have found that liquid anhydrous ammonia serves as an excellent solvent for the cellulose esters generally, being capable of dissolving a considerably greater number of the acetates and nitrates of cellulose than any of the solvents previously used, while the nature of the ammonia is such as to permit it to be readily removed from the cellulose compound by evaporation. By the use of liquid anhydrous ammonia cellulose acetates and nitrates can be dissolved so as to continue to possess the structure of the original cellulose acetates and nitrates without being degraded, that is, without losing their structural aggregates, thus forming a cellulose compound which can be shaped into any desired form and still retain the strength inherent in the original cellulose structure.

I propose to place the cellulose esters, such for example, as cellulose acetates, in a bath of liquid anhydrous ammonia, whereupon I find that they immediately dissolve to form a clear solution which can be readily freed from air bubbles or entrained gases, and the solution thus formed may then be caused to flow upon an endless belt, forced through minute apertures or placed in moulds and the ammonia freed from the solution by evaporation to form a transparent or translucent film, thread or other desired shape possessing a high degree of strength and capable of use for a variety of purposes.

Since anhydrous ammonia is liquefied only at comparatively low temperatures unless subjected to pressure in excess of that normally exerted by the atmosphere I prefer to effect the solution of the cellulose esters in the liquid anhydrous ammonia under a pressure somewhat greater than that normally exerted by the atmosphere and to evaporate off the ammonia from the resultant product by lowering the pressure below that at which the solution is effected. However, the anhydrous ammonia may be liquefied at normal atmospheric pressure by sufficiently lowering its temperature when it may be employed to dissolve the cellulose esters as above described and the ammonia substantially entirely removed by evaporation. In removing the ammonia from the cellulose compound in solution, the step of evaporating off the ammonia may be carried out under a pressure somewhat less than that normally exerted by the atmosphere if desired, in order to hasten the process. I prefer to effect the removal of the ammonia in an atmosphere from which moisture has been excluded so far as practicable in order to prevent the formation of bubbles in the cellulose compound and thus obtain a more uniform and high grade product. The ammonia used as a solvent can, of course, be readily recovered.

Having found that the nitrates of cellulose as well as the acetates are soluble in liquid anhydrous ammonia as above described, I may utilize liquid anhydrous ammonia for dissolving either cellulose acetates or cellulose nitrates separately or may mix cellulose acetates and cellulose nitrates in any desired proportions and dissolve the mixture in ammonia to obtain a cellulose compound possessing certain desired qualities when the solvent has been removed.

The product resulting from the treatment of cellulose esters as above described possesses certain advantages over similar products heretofore formed by dissolving cellulose esters in the solvents previously used, by reason of the fact that the liquid anhydrous ammonia may be substantially entirely removed from the compound, whereas it has been practically impossible to entirely eliminate the solvents previously used from the resultant product. Moreover, the fact that the liquid anhydrous ammonia more readily dissolves certain of the cellulose esters not heretofore readily soluble in the solvents previously known imparts to the resultant product, by reason of the inclusion of such esters therein, a structural strength not heretofore possible by the methods of treatment previously employed.

As one illustration of an important application of my invention, photographic films as now used are formed from cellulose esters and contain, when completed, silver salts and gelatine compounds. At the present time these films are generally burned after use to recover the silver deposited therein, while by the use of my improved method the cellulose esters of the film may be readily dissolved thus permitting the recovery of the cellulose for again forming a film and at the same time recovering the metallic silver and gelatine compounds which are not acted upon by the ammonia.

Having described my invention, what I claim is:

1. The process which comprises, treating a cellulose ester with liquid anhydrous ammonia to dissolve the cellulose ester.

2. The process which comprises, treating cellulose acetate with liquid anhydrous ammonia to dissolve the same, and then acting upon the mass to substantially remove the ammonia therefrom.

3. The process which comprises, treating a cellulose ester with liquid anhydrous ammonia to dissolve the same, and then substantially removing the ammonia therefrom under a pressure less than that at which the solution was effected.

4. The process which comprises, treating cellulose acetate with liquid anhydrous ammonia to dissolve the same, and then substantially removing the ammonia therefrom under a pressure less than that at which the solution was effected.

5. The process which comprises, treating a cellulose ester with liquid anhydrous ammonia to dissolve the cellulose ester, and then substantially removing the excess ammonia with exclusion of moisture.

6. The process which comprises, treating cellulose acetate with liquid anhydrous ammonia to dissolve the cellulose acetate, and then substantially removing the excess ammonia with exclusion of moisture.

7. The process of treating a cellulose compound which comprises, subjecting cellulose acetate to the action of liquid andhydrous ammonia.

8. The process of treating a cellulose compound which comprises, subjecting a cellulose ester to the action of liquid anhydrous ammonia under super-atmospheric pressure.

9. The process of treating a cellulose compound which comprises, subjecting a cellulose ester to the action of liquid anhydrous ammonia under super-atmospheric pressure, and then substantially removing the ammonia.

10. The process of treating a cellulose compound which comprises, subjecting cellulose acetate to the action of liquid ammonia under super-atmospheric pressure.

11. The process of treating a cellulose compound which comprises, subjecting cellulose acetate to the action of liquid ammonia under super-atmospheric pressure, and subsequently substantially removing the ammonia.

12. The process of treating a cellulose compound which comprises, subjecting a cellulose ester to the action of liquid anhydrous ammonia under super-atmospheric pressure, and then substantially removing the ammonia therefrom with exclusion of moisture.

13. The process of treating a cellulose compound which comprises, subjecting cellulose acetate to the action of liquid anhydrous ammonia under super-atmospheric pressure, and then substantially removing the ammonia therefrom with exclusion of moisture.

14. The process of treating a cellulose compound which comprises, subjecting a cellulose ester to the action of liquid anhydrous ammonia under super-atmospheric pressure, and then substantially removing the ammonia therefrom under a pressure less than that under which the solution was effected.

15. The process of treating a cellulose compound which comprises, subjecting cellulose acetate to the action of liquid anhydrous ammonia under super-atmospheric pressure, and then substantially removing the ammonia therefrom under a pressure less than that under which the solution was effected.

16. The process of treating a cellulose compound which comprises, subjecting a cellulose ester to the action of liquid anhydrous ammonia under super-atmospheric pressure, and then substantially removing the ammonia therefrom under a pressure less than that under which the solution was effected and with exclusion of moisture.

17. The process of treating a cellulose compound which comprises, subjecting cellulose acetate to the action of liquid anhydrous ammonia, under super-atmospheric pressure, and then substantially removing the ammonia therefrom under a pressure less than that under which the solution was effected and with exclusion of moisture.

In testimony whereof I have affixed my signature.

JOHN COLLINS CLANCY.